United States Patent
Wu et al.

(10) Patent No.: US 8,089,463 B2
(45) Date of Patent: Jan. 3, 2012

(54) CHARGEABLE WIRELESS MOUSE ATTACHABLE TO A COMPUTER HOST VIA A WIRELESS SIGNAL RECEIVER HAVING A CHARGING PLATE

(75) Inventors: Chun-Che Wu, Taipei (TW); Chun-Nan Su, Taipei (TW)

(73) Assignee: Primax Electronics Ltd., Taiei (TW)

( * ) Notice: Subject to any disclaimer, the term of this patent is extended or adjusted under 35 U.S.C. 154(b) by 402 days.

(21) Appl. No.: 12/472,503

(22) Filed: May 27, 2009

(65) Prior Publication Data
US 2010/0283733 A1 Nov. 11, 2010

(30) Foreign Application Priority Data
May 8, 2009 (TW) ................................ 98115272 A

(51) Int. Cl.
*G06F 3/033* (2006.01)
*G09G 5/08* (2006.01)
(52) U.S. Cl. ....................................................... 345/163
(58) Field of Classification Search .................. 345/173, 345/163–167, 156–157; 463/37–38
See application file for complete search history.

(56) References Cited

U.S. PATENT DOCUMENTS

| | | | |
|---|---|---|---|
| 7,925,296 B2 * | 4/2011 | Lin | 455/552.1 |
| 2002/0180703 A1 * | 12/2002 | Muir | 345/163 |
| 2006/0274043 A1 * | 12/2006 | Lu | 345/163 |

* cited by examiner

*Primary Examiner* — Chanh Nguyen
*Assistant Examiner* — Tsegaye Seyoum
(74) *Attorney, Agent, or Firm* — Kirton & McConkie; Evan R. Witt

(57) ABSTRACT

A chargeable wireless mouse includes a mouse body, a chargeable battery, a charging slot and a wireless signal receiver. A magnetic element and an electricity conducting structure are disposed within the charging slot. The wireless signal receiver includes a USB connecting part and a charging plate member. The wireless signal receiver is connected with a computer host via a USB connecting port. When the wireless signal receiver is accommodated within the charging slot, the metallic plate member is magnetically attracted by the magnetic element and the wireless signal receiver is clamped by the electricity conducting structure, so that the wireless signal receiver is fixed in the charging slot. At the same time, the charging plate member is contacted with the conducting member such that electricity is transmitted to charge the chargeable battery.

14 Claims, 5 Drawing Sheets

CHARGEABLE WIRELESS MOUSE ATTACHABLE TO A COMPUTER HOST VIA A WIRELESS SIGNAL RECEIVER HAVING A CHARGING PLATE

FIELD OF THE INVENTION

The present invention relates to a wireless mouse, and more particularly to a chargeable wireless mouse.

BACKGROUND OF THE INVENTION

With increasing development of scientific technologies, multimedia products and computers become essential in our daily lives. In the computer systems, input devices play important roles for communicating the computer and the user. The common input devices of the computer systems include for example mice, keyboards or trackballs. Among these input devices, mice are the most prevailing because they are very easy-to-use. When a mouse is held on the palm of the user's hand, the user may move the mouse to control movement of the cursor shown on the computer screen. In addition, by operating the click buttons of the mouse device, the user may select a desired item on the function menu of the browsing frame or execute a corresponding function.

Conventionally, a mouse is communicated with a computer via wire linkage. The wire linkage is very troublesome and inconvenient. Recently, a wireless muse has been proposed. Instead of using the connecting wire, a corresponding wireless signal receiver is used for receiving wireless signals issued from the mouse body when the wireless mouse is operated. Since no additional connecting wire is required to connect the wireless mouse with the computer, the application of the wireless mouse is no longer restricted by the connecting wire. In other words, the use of the wireless mouse is more convenient. In addition to the wireless mouse, other wireless peripheral devices such as wireless earphones, wireless keyboards and the like are communicated with the computer according to a wireless transmission technology. Among these wireless peripheral devices, the wireless mouse is very popular.

Although the wireless mouse has no spatial restriction resulting from the physical connecting wire, there are still some drawbacks. For example, when the wireless mouse is operated, the electric energy supply system becomes more important. Unlike the wired mouse, the wireless mouse has no physical connecting wire to receive electricity from the computer. Therefore, the wireless mouse usually has a built-in electric energy storage element such as a battery or a reusable and chargeable battery.

Hereinafter, a method of charging a wireless mouse will be illustrated with reference to FIG. 1. FIG. 1 is a schematic perspective view illustrating a computer system having a function of charging a wireless mouse according to the prior art. As shown in FIG. 1, the computer system 1 includes a computer host 10, a wireless mouse 11, a wireless signal receiver 12 and a wireless mouse charger 13. The computer host 10 has a universal serial bus (USB) connecting port (not shown). The wireless mouse 11 has a chargeable battery 111. The wireless signal receiver 12 could be inserted into the USB connecting port for receiving a wireless signal that is issued by the wireless mouse 11. As such, the wireless mouse 1 could be normally operated. Moreover, the wireless mouse charger 13 has a charging slot 131 for accommodating the wireless mouse 11. Several charging contacts 132 are formed in the charging slot 131. For charging the chargeable battery 111 of the wireless mouse 11, the wireless mouse 11 is accommodated in the charging slot 131 such that the charging contacts 132 of the wireless mouse charger 13 are in contact with corresponding charging contacts (not shown) of the wireless mouse 11. Meanwhile, electrical energy may be transmitted from the wireless mouse charger 13 to the wireless mouse 11 in order to charge the chargeable battery 111 of the wireless mouse 11. Furthermore, as shown in FIG. 1, the wireless mouse charger 13 has a receiver storing part 133 for storing the wireless signal receiver 12.

There are two power sources for providing electricity to the wireless mouse charger 13. The first power source is a utility power source. As shown in FIG. 1, when the wireless mouse charger 13 is connected with a DC converter 134 through a DC converter connector 1341 and the DC converter 134 is connected to a utility power source (not shown), electricity will be transmitted from the utility power source to the wireless mouse charger 13. The second power source is the computer host 10. By inserting a USB connecting wire 135 into a USB connecting port of the computer host 10, electricity will be transmitted from the computer host 10 to the wireless mouse charger 13.

Although the method of charging the wireless mouse is very convenient, there are still some drawbacks. For example, it is necessary to carry the wireless mouse charger 13 for charging the chargeable battery 111 of the wireless mouse 11. In a case that this wireless mouse is used in other places, the user should carry the DC converter 134 or the USB connecting wire 135 at the same time. If the user forgets to carry the wireless mouse charger 13 and the DC converter 134 or the USB connecting wire 135, the charging operation fails to be done. That is, since the wireless mouse charger 13 is separated from the wireless mouse 11, the probability of forgetting to carry the wireless mouse charger 13 is increased and the use of the wireless mouse charger 13 is troublesome.

SUMMARY OF THE INVENTION

It is an object of the present invention to provide a chargeable wireless mouse.

Another object of the present invention provides a chargeable wireless mouse that is connectable to and attachable onto a computer host.

In accordance with an aspect of the present invention, there is provided a chargeable wireless mouse. The chargeable wireless mouse includes a mouse body, a main circuit board, a chargeable battery, a charging slot and a wireless signal receiver. The mouse body has a lower portion. The main circuit board is disposed within the mouse body. The chargeable battery is disposed within the mouse body and connected to the main circuit board for storing electricity. The charging slot is formed in the lower portion of the mouse body. In addition, a first magnetic element, a first electricity conducting structure and a second electricity conducting structure are disposed within the charging slot. The first electricity conducting structure and the second electricity conducting structure are connected to the main circuit board. The first electricity conducting structure includes a first conductive casing, a first metallic ball, a first spring and a first conductive upper cover. The first conductive casing has a first opening. The first metallic ball is disposed within the first conductive casing, slightly penetrated through the first opening and exposed outside the first conductive casing. The first spring is disposed within the first conductive casing and sustained against the first metallic ball, so that the first metallic ball is movable within the first conductive casing. The first conductive upper cover shelters the first conductive casing and is connected with the main circuit board. The wireless signal receiver is connected to a USB connecting port of a computer host for receiving a wireless signal emitted by the wireless mouse. The wireless signal receiver includes a holding part, a receiver circuit board, a USB connecting part and a charging plate member. The receiver circuit board is disposed within the holding part. The USB connecting part is disposed at a first end of the holding part to be connected with the USB connecting port of the computer host, wherein electricity of the computer host is transmitted to the receiver circuit board through the USB connecting part. The charging plate member is mounted on the receiver circuit board and exposed outside the holding part. When the wireless signal receiver is accommodated within the charging slot, the charging plate member is contacted with the first metallic ball of the first electricity conducting structure, so that electricity is transmitted from the receiver circuit board to the chargeable battery. In addition, when the wireless signal receiver is accommodated within the charging slot, the charging plate member is magnetically attracted by the first magnetic element and the first metallic ball is sustained against the charging plate member to provide a clamping force on the charging plate member, so that the wireless signal receiver is fixed in the charging slot.

In an embodiment, the main circuit board has a charging circuit for controlling transmission of the electricity from the main circuit board to the chargeable battery.

In an embodiment, the wireless signal receiver further includes a second magnetic element, which is disposed within the holding part and contacted with the charging plate member, for magnetically attracting the charging plate member.

In an embodiment, the first magnetic element and the second magnetic element are magnets.

In an embodiment, the charging plate member is made of metallic material.

In an embodiment, the first conductive casing and the first conductive upper cover of the first electricity conducting structure are made of metallic material.

In an embodiment, the second electricity conducting structure includes a resilient metallic sheet.

In an embodiment, the main circuit board further includes multiple board holes, and the first conductive upper cover and the resilient metallic sheet are inserted into corresponding board holes, so that the first electricity conducting structure and the resilient metallic sheet are fixed on the main circuit board.

In an embodiment, the second electricity conducting structure includes a second conductive casing, a second metallic ball, a second spring and a second conductive upper cover. The second conductive casing has a second opening. The second metallic ball is disposed within the second conductive casing, slightly penetrated through the second opening and exposed outside the second conductive casing. The second spring is disposed within the second conductive casing and sustained against the second metallic ball, so that the second metallic ball is movable within the second conductive casing. The second conductive upper cover shelters the second conductive casing and is connected with the main circuit board.

In an embodiment, the main circuit board further includes multiple board holes, and the first conductive upper cover and the second conductive upper cover are inserted into corresponding board holes, so that the first electricity conducting structure and the second electricity conducting structure are fixed on the main circuit board.

In an embodiment, the second conductive casing and the second conductive upper cover of the second electricity conducting structure are made of metallic material.

In an embodiment, the charging plate member includes a positive electrode charging plate and a negative electrode charging plate. When the wireless signal receiver is inserted into the charging slot, the first electricity conducting structure and the second electricity conducting structure are respectively contacted with the positive electrode charging plate and a negative electrode charging plate so as to transmit electricity.

In an embodiment, the chargeable wireless mouse is a slim-type wireless mouse.

In an embodiment, the chargeable wireless mouse is a shape-changeable mouse.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
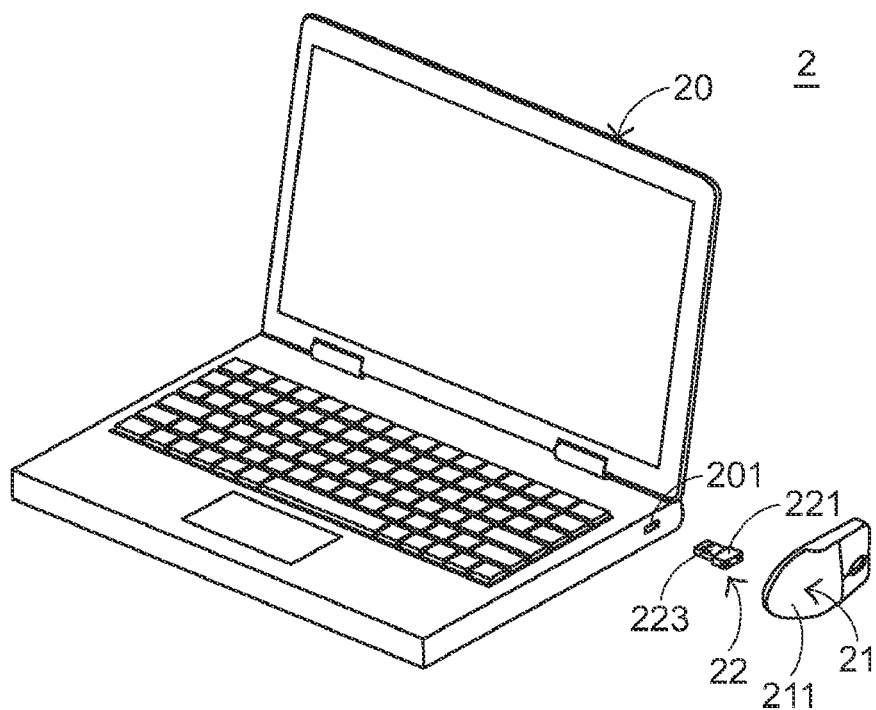
FIG. 2 is a schematic perspective view illustrating a computer system having a function of charging a wireless mouse according to a first embodiment of the present invention.

FIG. 2 is a schematic perspective view illustrating a computer system having a function of charging a wireless mouse according to a first embodiment of the present invention. As shown in FIG. 2, the computer system 2 comprises a computer host 20 and a wireless mouse 21. The computer host 20 has a USB connecting port 201. The wireless mouse 21 can generate a wireless signal. The wireless mouse 21 comprises a mouse body 211 and a wireless signal receiver 22. The wireless signal receiver 22 is used for receiving the wireless signal. After the wireless signal receiver 22 is inserted into the USB connecting port 201 of the computer host 20, the wireless signal can be received by the wireless signal receiver 22 and then transmitted to the computer host 20. Moreover, the wireless signal receiver 22 comprises a holding part 221 and a USB connecting part 223. The holding part 221 can be held by the user. The USB connecting part 223 is disposed at a first end of the holding part 221 to be inserted into the USB connecting port 201 of the computer host 20.

Figure 3:
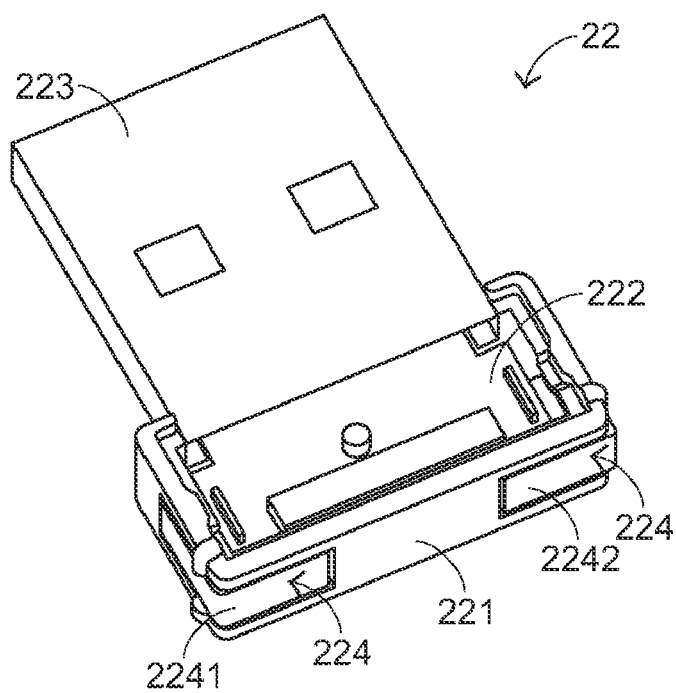
FIG. 3 is a schematic perspective view illustrating an exemplary wireless signal receiver of the chargeable wireless mouse of the present invention.

Hereinafter, the internal portion of the wireless signal receiver 22 will be illustrated with reference to FIG. 3. FIG. 3 is a schematic perspective view illustrating an exemplary wireless signal receiver of the chargeable wireless mouse of the present invention. The internal portion of the wireless signal receiver 22 comprises a receiver circuit board 222 and a charging plate member 224. The receiver circuit board 222 is disposed within the holding part 221. The charging plate member 224 is connected to the receiver circuit board 222 and exposed outside the holding part 221. In addition, the charging plate member 224 comprises a positive electrode charging plate 2241 and a negative electrode charging plate 2242.

Figure 4:
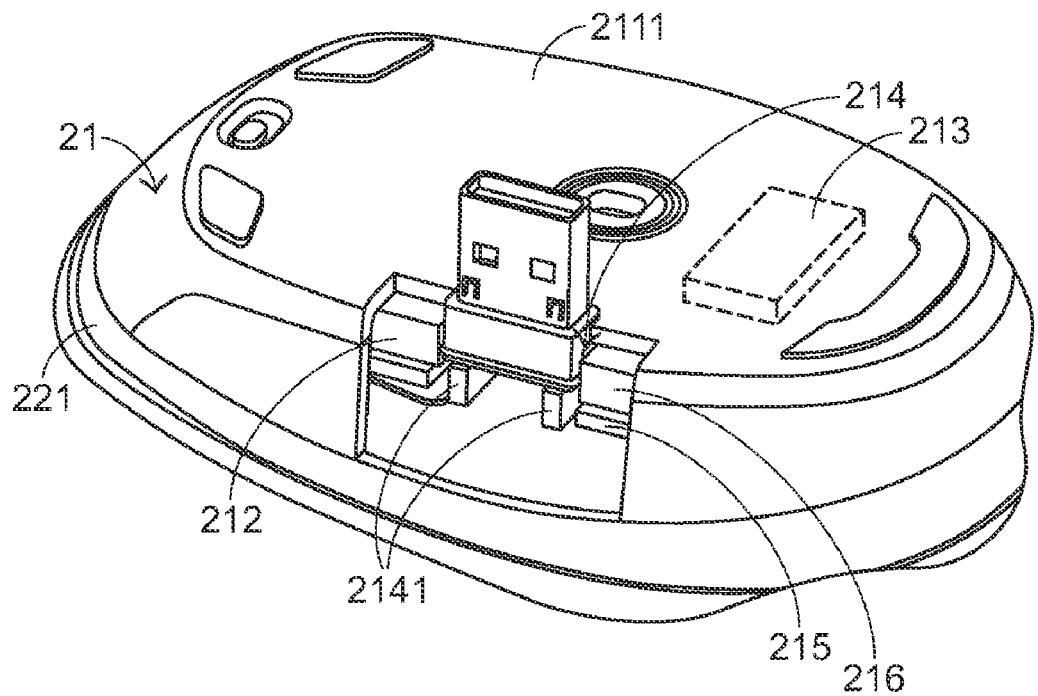
FIG. 4 is a schematic cutaway view illustrating the chargeable wireless mouse according to the first embodiment of the present invention, in which the wireless signal receiver is accommodated within the charging slot.

FIG. 4 is a schematic cutaway view illustrating the chargeable wireless mouse according to the first embodiment of the present invention, in which the wireless signal receiver is accommodated within the charging slot. As shown in FIG. 4, in addition to the mouse body 211, the wireless mouse 21 further comprises a charging slot 214, a main circuit board 215 and a chargeable battery 213. The mouse body 211 has a lower portion 2111. The charging slot 214 is formed in the lower portion 2111 of the mouse body 211. The chargeable battery 213 is used for providing electricity required for operating the wireless mouse 21. The chargeable battery 213 can be charged and reused. Moreover, a first magnetic element 2141, a first electricity conducting structure 212 and a second electricity conducting structure 216 are disposed within the charging slot 214. The first magnetic element 2141 can provide a magnetic force for attracting the charging plate member 224. An example of the first magnetic element 2141 is a magnet. The first electricity conducting structure 212 and the second electricity conducting structure 216 are connected to the main circuit board 215 for transmitting electricity to the main circuit board 215.

Figure 5:
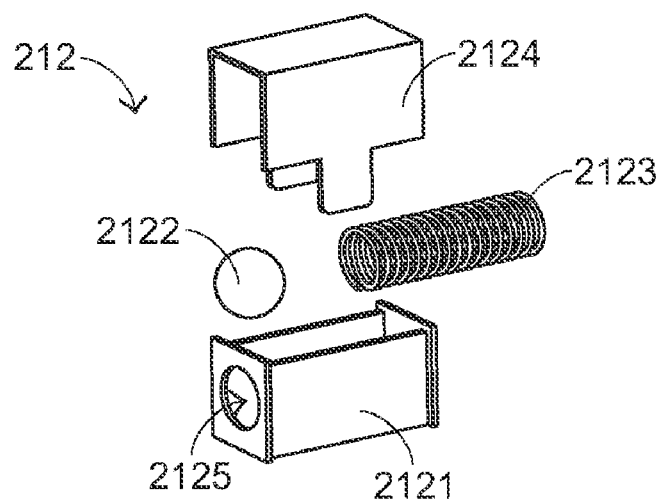
FIG. 5 is a schematic exploded view illustrating the first electricity conducting structure used in the chargeable wireless mouse according to the first embodiment of the present invention.

The internal portion of the first electricity conducting structure 212 will be illustrated with reference to FIG. 5. FIG. 5 is a schematic exploded view illustrating the first electricity conducting structure used in the chargeable wireless mouse according to the first embodiment of the present invention. The first electricity conducting structure 212 comprises a first conductive casing 2121, a first metallic ball 2122, a first spring 2123 and a first conductive upper cover 2124. The first conductive casing 2121 has a first opening 2125. The first metallic ball 2122 is disposed within the first conductive casing 2121. In addition, the first metallic ball 2122 is slightly penetrated through the first opening 2125 so as to be exposed outside the first conductive casing 2121. In addition, the first spring 2123 is disposed within the first conductive casing 2121 and sustained against the first metallic ball 2122, so that the first metallic ball 2122 is movable within the first conductive casing 2121. The first conductive upper cover 2124 shelters the first conductive casing 2121. In addition, the first conductive upper cover 2124 is also connected to the main circuit board 215. In this embodiment, the second electricity conducting structure 216 comprises a second conductive casing 2161, a second metallic ball 2162, a second spring 2163 and a second conductive upper cover 2164. The second conductive casing 2161 has a second opening 2165. The configurations and the relations between the components of the second electricity conducting structure 216 are identical to those of the first electricity conducting structure 212, and are not redundantly described herein.

Figure 6:
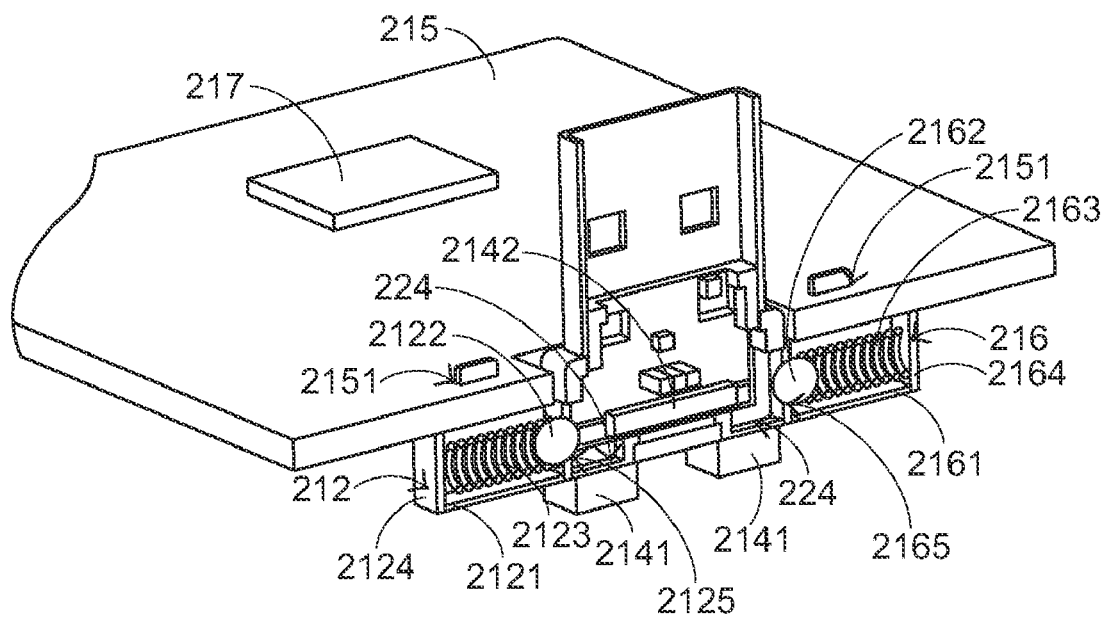
FIG. 6 is a schematic cutaway view illustrating the relation between the wireless signal receiver, the electricity conducting structures and the main circuit board of the chargeable wireless mouse according to the first embodiment of the present invention.

FIG. 6 is a schematic cutaway view illustrating the relation between the wireless signal receiver, the electricity conducting structures and the main circuit board of the chargeable wireless mouse according to the first embodiment of the present invention. As shown in FIG. 6, the main circuit board 215 comprises multiple board holes 2151. The first conductive upper cover 2124 and the second conductive upper cover 2164 are inserted into corresponding board holes 2151, so that the first electricity conducting structure 212 and the second electricity conducting structure 216 are fixed on the main circuit board 215. For clarifying the first electricity conducting structure 212 and the second electricity conducting structure 216, the charging plate member 224 that is contacted with these two conducting structures 212 and 216 is partially shown in FIG. 6. The first conductive casing 2121 and the first conductive upper cover 2124 of the first electricity conducting structure 212 and the second conductive casing 2161 and the second conductive upper cover 2164 of the second electricity conducting structure 216 are made of metallic material, thereby providing the capability of conducting electricity. Please refer to FIG. 6 again. The main circuit board 215 further comprises a charging circuit 217 for controlling the electricity to be transmitted from the main circuit board 215 to the chargeable battery 213 (see FIG. 4). Moreover, the wireless signal receiver 22 further comprises a second magnetic element 2142. The second magnetic element 2142 is disposed within the holding part 221 and contacted with the charging plate member 224. The second magnetic element 2142 may provide a magnetic force to the charging plate member 224, thereby facilitating the charging plate member 224 to be magnetically attracted by the first magnetic element 2141. An example of the second magnetic element 2142 is a magnet.

Figure 7:
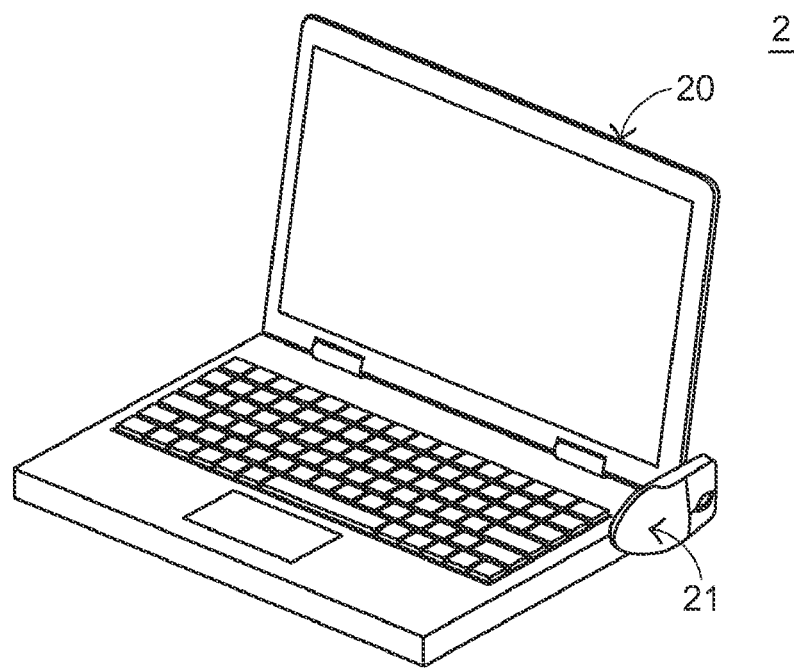
FIG. 7 is a schematic perspective view illustrating the chargeable wireless mouse of the present invention that is attached on a computer host to be charged by the computer system.

For using the wireless mouse 21 to operate the computer host 20 in the computer system 2, the USB connecting part 223 of the wireless signal receiver 22 needs to be inserted into the USB connecting port 201 of the computer host 20, so that electricity is transmitted from the computer host 20 to the wireless signal receiver 22 through the USB connecting part 223. After the electricity is transmitted to the receiver circuit board 222 within the wireless signal receiver 22, the wireless signal receiver 22 is enabled. For charging the wireless mouse 21, the charging slot 214 of the wireless mouse 21 is aligned with the wireless signal receiver 22 so as to accommodate the wireless signal receiver 22 within the charging slot 214 (see FIG. 4). Meanwhile, the wireless mouse 21 is attached on the computer host 20, as can be seen in FIG. 7.

Please refer to FIG. 6 again. When the wireless signal receiver 22 is inserted into the charging slot 214, the holding part 221 of the wireless signal receiver 22 is sustained against the first metallic ball 2122 of the first electricity conducting structure 212 and the second metallic ball 2162 of the second electricity conducting structure 216. As such, the first spring 2123 and the second spring 2163 are respectively compressed by the first metallic ball 2122 and the second metallic ball 2162 to be in the compressed state. Moreover, the first electricity conducting structure 212 and the second electricity conducting structure 216 are respectively contacted with the positive electrode charging plate 2241 and the negative electrode charging plate 2242 of the charging plate member 224. Due to the restoring forces offered by the compressed springs 2123 and 2163, the wireless signal receiver 22 is clamped within the charging slot 214. On the other hand, after the wireless signal receiver 22 is inserted into the charging slot 214, the charging plate member 224 at the second end of the wireless signal receiver 22 is contacted with the first magnetic element 2141 that is disposed within the charging slot 214. Since the charging plate member 224 is magnetically attracted by the first magnetic element 2141 and the second magnetic element 2142, the wireless signal receiver 22 could be firmly fixed in the charging slot 214. By the way, the magnetic forces offered by the magnetic elements 2141 and 2142 are principally used for fixing the wireless signal receiver 22 in the charging slot 214. The clamping forces offered by the first electricity conducting structure 212 and the second electricity conducting structure 216 may facilitate fixing the wireless signal receiver 22 in the charging slot 214.

Since the charging plate member 224 of the wireless signal receiver 22 is contacted with the electricity conducting structures 212 and 216 of the wireless mouse 21, electricity could be transmitted from the computer host 20 to the chargeable battery 213 of the wireless mouse 21 through the wireless signal receiver 22. Moreover, along the path of transmitting electricity, the electricity of the computer host 20 is transmitted to the wireless signal receiver 22 through the USB connecting port 201 (see FIG. 2), then transmitted from the receiver circuit board 222 (see FIG. 3) to the charging plate member 224 and the electricity conducting structures 212 and 216, then transmitted to the main circuit board 215, and finally transmitted from the main circuit board 215 to the chargeable battery 213. The mechanism of transmitting the electricity is controlled by the charging circuit 217 of the main circuit board 215.

Figure 8:
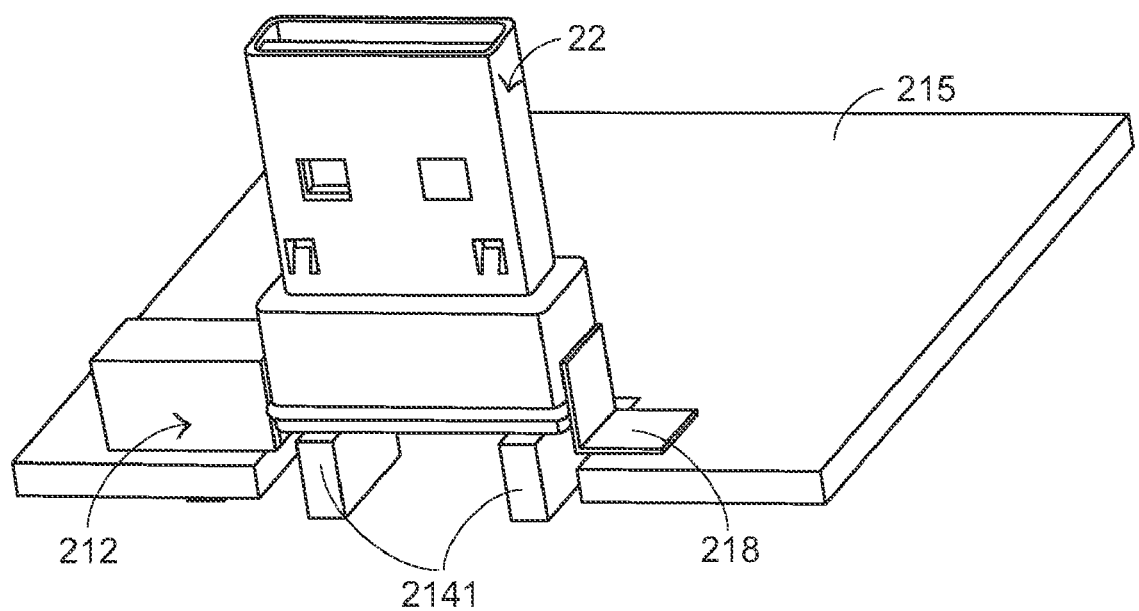
FIG. 8 is a schematic perspective view illustrating the relation between the wireless signal receiver and the electricity conducting structures of the chargeable wireless mouse according to a second embodiment of the present invention.

For further reducing the fabricating cost, the chargeable wireless mouse of the present invention could be further modified. FIG. 8 is a schematic perspective view illustrating the relation between the wireless signal receiver and the electricity conducting structures of the chargeable wireless mouse according to a second embodiment of the present invention. As shown in FIG. 8, the second electricity conducting structure 218 is a resilient metallic sheet. The resilient metallic sheet 218 is inserted into a corresponding board hole (not shown) and the resilient metallic sheet 218 is fixed on the main circuit board 215. When the wireless signal receiver 22 is inserted into the charging slot 214, the wireless signal receiver 22 is fixed in the charging slot 214 because of the magnetic force offered by the first magnetic element 2141. In addition, the clamping forces offered by the first electricity conducting structure 212 and the resilient metallic sheet 218 may facilitate fixing the wireless signal receiver 22 in the charging slot 214. The configurations and functions of other components included in the chargeable wireless mouse of the second embodiment are identical to those of the first embodiment, and are not redundantly described herein.

Figure 1:
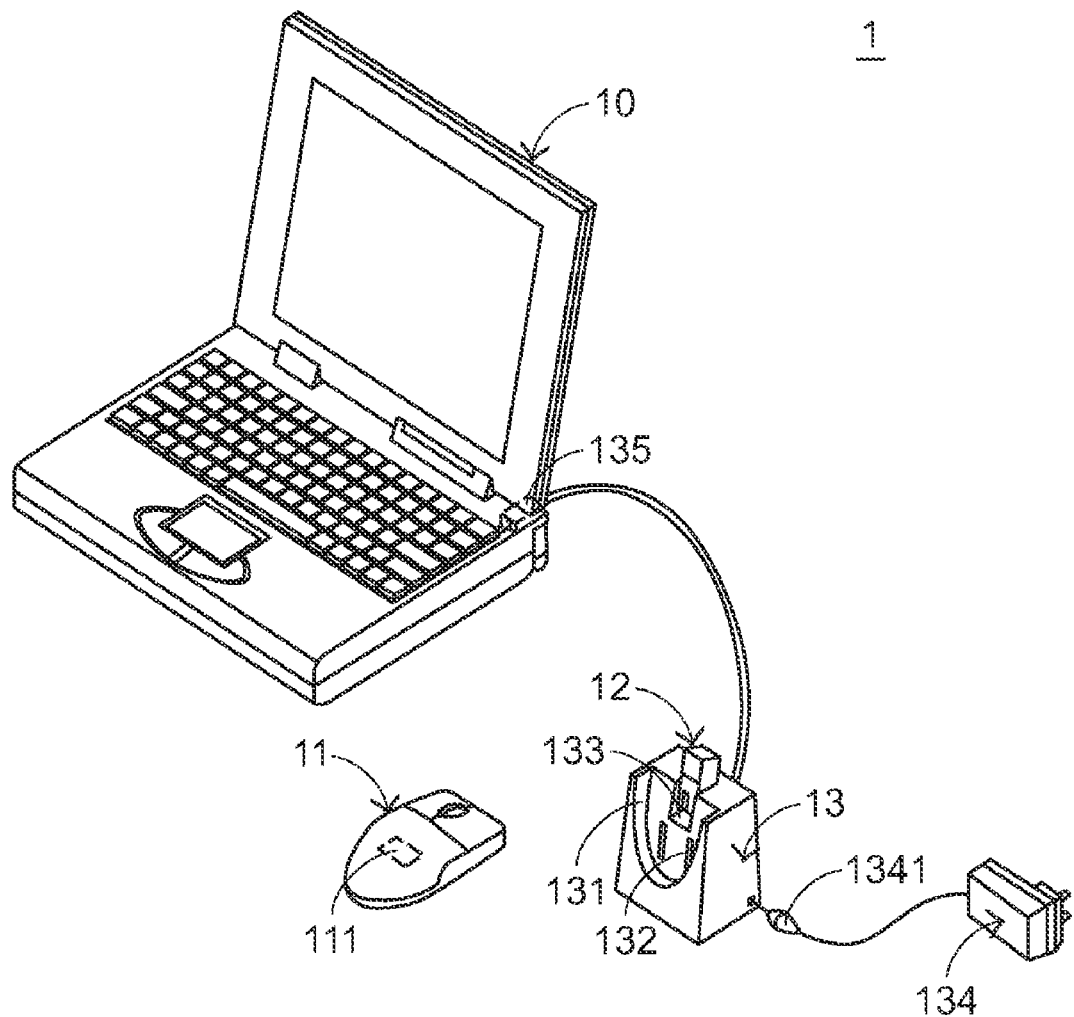
FIG. 1 is a schematic perspective view illustrating a computer system having a function of charging a wireless mouse according to the prior art.

In the above embodiments, the wireless mouse of the present invention has a charging slot, and magnetic elements and electricity conducting structures are disposed within the charging slot. When the USB connecting part of the wireless signal receiver is inserted into the USB connecting port of the computer host and the holding part of the wireless signal receiver is inserted into the charging slot, the electricity conducting structures within the charging slot are contacted with the charging plate member of the wireless signal receiver so as to transmit electricity. In other words, the wireless mouse can be directly charged by the computer system without the need of carrying an additional wireless mouse charger as shown in FIG. 1. Moreover, since the charging plate member of the wireless signal receiver is magnetically attracted by the magnetic elements within the charging slot and the wireless signal receiver is clamped by the electricity conducting structures, the wireless signal receiver can be firmly fixed in the charging slot and the wireless signal receiver is securely connected with the computer host. Moreover, once the wireless mouse is connected with the computer host through the wireless signal receiver, the user could simultaneously carry the computer host and the wireless mouse without the need of holding the wireless mouse by hand.

From the above description, the chargeable wireless mouse of the present invention can be directly charged by the computer host without the need of carrying an additional wireless mouse charger. In addition, the mouse body is firmly connected with the wireless signal receiver when the wireless mouse is operated in the charging mode. In comparison with the conventional mouse charging technologies, the wireless mouse of the present invention is more user-friendly and industrially feasible. The present invention is illustrated by referring an ordinary-shaped mouse. Nevertheless, the present invention may be applied to other wireless mouse (e.g. a shape-changeable wireless mouse or a slim-type wireless mouse) as long as the shape or the configuration of the wireless mouse is permitted to be attached onto the computer host.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A chargeable wireless mouse comprising:
a mouse body having a lower portion;
a main circuit board disposed within said mouse body;
a chargeable battery disposed within said mouse body and connected to said main circuit board for storing electricity;
a charging slot formed in said lower portion of said mouse body, wherein a first magnetic element, a first electricity conducting structure and a second electricity conducting structure are disposed within said charging slot, said first electricity conducting structure and a second electricity conducting structure are connected to said main circuit board, and said first electricity conducting structure comprises:
a first conductive casing having a first opening;
a first metallic ball disposed within said first conductive casing, slightly penetrated through said first opening and exposed outside said first conductive casing;
a first spring disposed within said first conductive casing and sustained against said first metallic ball, so that said first metallic ball is movable within said first conductive casing; and
a first conductive upper cover sheltering said first conductive casing and connected with said main circuit board; and
a wireless signal receiver connected to a USB connecting port of a computer host for receiving a wireless signal emitted by said wireless mouse, said wireless signal receiver comprising:
a holding part;
a receiver circuit board disposed within said holding part;
a USB connecting part disposed at a first end of said holding part to be connected with said USB connecting port of said computer host, wherein electricity of said computer host is transmitted to said receiver circuit board through said USB connecting part; and
a charging plate member mounted on said receiver circuit board and exposed outside said holding part,
wherein when said wireless signal receiver is accommodated within said charging slot, said charging plate member is contacted with said first metallic ball of said first electricity conducting structure, so that electricity is transmitted from said receiver circuit board to said chargeable battery, and
wherein when said wireless signal receiver is accommodated within said charging slot, said charging plate member is magnetically attracted by said first magnetic element and said first metallic ball is sustained against said charging plate member to provide a clamping force on said charging plate member, so that said wireless signal receiver is fixed in said charging slot.

2. The chargeable wireless mouse according to claim 1 wherein said main circuit board has a charging circuit for controlling transmission of said electricity from said main circuit board to said chargeable battery.

3. The chargeable wireless mouse according to claim 1 wherein said wireless signal receiver further comprises a second magnetic element, which is disposed within said holding part and contacted with said charging plate member, for magnetically attracting said charging plate member.

4. The chargeable wireless mouse according to claim 3 wherein said first magnetic element and said second magnetic element are magnets.

5. The chargeable wireless mouse according to claim 1 wherein said charging plate member is made of metallic material.

6. The chargeable wireless mouse according to claim 1 wherein said first conductive casing and said first conductive upper cover of said first electricity conducting structure are made of metallic material.

7. The chargeable wireless mouse according to claim 1 wherein said second electricity conducting structure includes a resilient metallic sheet.

8. The chargeable wireless mouse according to claim 7 wherein said main circuit board further comprises multiple board holes, and said first conductive upper cover and said resilient metallic sheet are inserted into corresponding board holes, so that said first electricity conducting structure and said resilient metallic sheet are fixed on said main circuit board.

9. The chargeable wireless mouse according to claim 1 wherein said second electricity conducting structure comprises:
    a second conductive casing having a second opening;
    a second metallic ball disposed within said second conductive casing, slightly penetrated through said second opening and exposed outside said second conductive casing;
    a second spring disposed within said second conductive casing and sustained against said second metallic ball, so that said second metallic ball is movable within said second conductive casing; and
    a second conductive upper cover sheltering said second conductive casing and connected with said main circuit board.

10. The chargeable wireless mouse according to claim 9 wherein said main circuit board further comprises multiple board holes, and said first conductive upper cover and said second conductive upper cover are inserted into corresponding board holes, so that said first electricity conducting structure and said second electricity conducting structure are fixed on said main circuit board.

11. The chargeable wireless mouse according to claim 8 wherein said second conductive casing and said second conductive upper cover of said second electricity conducting structure are made of metallic material.

12. The chargeable wireless mouse according to claim 1 wherein said charging plate member includes a positive electrode charging plate and a negative electrode charging plate, wherein when said wireless signal receiver is inserted into said charging slot, said first electricity conducting structure and said second electricity conducting structure are respectively contacted with said positive electrode charging plate and a negative electrode charging plate so as to transmit electricity.

13. The chargeable wireless mouse according to claim 1 wherein said chargeable wireless mouse is a slim-type wireless mouse.

14. The chargeable wireless mouse according to claim 1 wherein said chargeable wireless mouse is a shape-changeable mouse.

* * * * *